United States Patent
Baumgart et al.

(10) Patent No.: US 6,578,194 B1
(45) Date of Patent: Jun. 10, 2003

(54) SYSTEM AND METHOD USING EXTENDED RELOCATION TYPES AND OPERATIONS IN RELOCATING OPERATIONS

(75) Inventors: Leona Dryden Baumgart, Los Gatos, CA (US); John Robert Ehrman, Sunnyvale, CA (US); Richard E. Lee, deceased, late of Milipitas, CA (US); Barbara Ann Lee, legal representative, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/392,128

(22) Filed: Sep. 8, 1999

(51) Int. Cl.$^7$ .................................................. G06F 9/45
(52) U.S. Cl. ...................... 717/140; 717/139; 717/136; 717/153; 712/221; 712/223; 714/222
(58) Field of Search .................................. 717/136, 162, 717/131, 140, 163, 139, 147, 153, 159; 712/221, 223; 709/331, 205, 221; 714/722

(56) References Cited

U.S. PATENT DOCUMENTS

| | | | | |
|---|---|---|---|---|
| 4,791,558 A | * | 12/1988 | Chaitin et al. | 717/140 |
| 5,274,820 A | * | 12/1993 | Gillet | 717/139 |
| 5,339,419 A | * | 8/1994 | Chan et al. | 717/147 |
| 5,469,572 A | * | 11/1995 | Taylor | 717/152 |
| 5,519,866 A | * | 5/1996 | Lawrence et al. | 717/162 |
| 5,553,286 A | | 9/1996 | Lee | |
| 5,586,330 A | * | 12/1996 | Knudsen et al. | 717/117 |
| 5,734,822 A | * | 3/1998 | Houha et al. | 709/216 |
| 5,764,987 A | * | 6/1998 | Eidt et al. | 717/100 |
| 5,933,642 A | * | 8/1999 | Greenbaum et al. | 717/140 |
| 6,106,574 A | * | 8/2000 | Baisley et al. | 717/140 |
| 6,112,025 A | * | 8/2000 | Mulchandani et al. | 709/331 |
| 6,182,283 B1 | * | 1/2001 | Thomson | 717/153 |
| 6,219,830 B1 | * | 4/2001 | Eidt et al. | 710/68 |
| 6,345,384 B1 | * | 2/2002 | Sato | 717/160 |

OTHER PUBLICATIONS

The Book, Title: Microsoft Press Computer Dictionary, Third Edition, Published by Microsoft Press, 1997, p. 60–61.*
TITLE: An architectural framework for migration from CISC to higher performance platforms, author: Gabriel M. Silberman, Kemal Ebcio, ACM, Aug. 1992.*
TITLE: Object and native code thread mobility among heterogeneous computers (includes sources), author: B. Steensgaard, E. Jul, ACM, Dec. 1995.*
L. Presser, et al., "Linkers and Loaders", 09/72, Computing Surveys, vol. 4, No. 3, pp. 149–167.
IBM Manuel, "High Level Assembler for MVS & VM & VSM", Language Reference MVS and VM, Release 2, 3/95, pp. 131–138.

* cited by examiner

Primary Examiner—Gregory Morse
Assistant Examiner—Chameli C. Das
(74) Attorney, Agent, or Firm—David W. Victor; Konrad Raynes Victor & Mann, LLP

(57) ABSTRACT

A method, apparatus, and article of manufacture for the inclusion of extended relocation types and operations performed thereon in a relocation directory within an object module or load module. The relocation directory includes a field to describe the referenced item relocated into the address constant location within the text, which may be a numerical value, symbol, address, set of data or instructions or symbol. The relocation directory further includes a field to describe the operation performed on the referenced item and the present contents of the address constant, which includes operations such as subtraction, addition, division, multiplication, logical AND, logical OR, shifting, logical XOR, and moving. The result of the operation performed on the referenced item and the content of the address constant is relocated into the address constant location.

21 Claims, 5 Drawing Sheets

SYSTEM AND METHOD USING EXTENDED RELOCATION TYPES AND OPERATIONS IN RELOCATING OPERATIONS

BACKGROUND OF THE INVENTION

1. Field of the Invention

The present invention relates generally to the compiling, loading, and execution of a computer program and, in particular, to the inclusion of extended information in a relocation directory for items that must be relocated into text before program execution, including information on the type of data involved in the relocation and an operation to be performed on the relocated item.

2. Description of the Related Art

Programmers write computer programs in high level languages such as FORTRAN and COBOL that include many descriptive terms that help the programmer write, structure, organize, and debug the program. This high level language program is referred to as the source code and includes data declarations and instructions which operate on that data. All addressing is symbolic, which means that the programmer assigns labels (names) to individual data elements and instructions to use throughout the program. Before the program can be executed, the source code must be transformed to machine readable executable code.

An assembler or compiler, referred to herein as a source translator, translates the source module into an object module, which includes machine readable executable code, data, external symbol definitions and references, address constants, and further bookkeeping information used in the process of transforming the object module into an executable file. Symbol references and address constants in one object module may reference text defined in another object module. The term "text" as defined and used herein means data and/or code. A linkage editor combines one or more object or load modules into a load module in preparation for execution. Typically, the linkage editor combines object modules that contain a single definition of a symbol, i.e., symbol definition, and one or more references to the symbol, i.e., symbol references. If one object module includes a reference to an external symbol defined in another object module, then the linkage editor may resolve this reference with the definition in the load module.

Included in object modules are address constants. An address constant is a cell or field that is filled in later with information characterizing another location or module, such as its address. The information characterizing the referenced symbol will be relocated into the location of the address constant at translation time, bind time, or execution time. The object module includes information on the location of the address constant and the name of the referenced symbol. The referenced symbol can be internal or external to the object module which includes the address constant making the reference. Presently, the address constant is typically used to add the referenced address to the text at the location of the address constant in preparation for the relocation performed at execution time, when the load point of the program is known. The address constant may reference an external symbol. The address constant may contain other types of information, such as offsets, pseudo register vector lengths, constants, etc. During binding operations, the address defined by the external symbol may be relocated into the address constant location. This referenced information may also be relocated into the location of the address constant at execution time. The address constant may reference an external symbol. Further description of the types of address constants and their use is described in the International Business Machines Corporation (IBM) publication "High Level Assembler for MVS & VM & VSE: Language Reference MVS & VM, Release 2," IBM document no. SC26-4940-01 (Copyright IBM Corp., 1995), which publication is incorporated herein by reference in its entirety. Further details of object modules are described in the publication "Linkers and Loaders," by Leon Presser and John R,. White, ACM Computing Surveys, Vol. 4, No. 32, September 1972, pp. 149–167, which is incorporated by reference herein in its entirety, and the commonly assigned U.S. patent entitled "System and Method for Preparing a Computer Program for Execution," U.S. Pat. No. 5,553,286, which publication and patent are incorporated herein by reference in its entirety.

Current use of address constants provides only a limited range of operations that may be performed with respect to the referenced item and address constant. There is thus a need in the art for a more robust and flexible address constant that allows further operations to be performed with respect to the referenced item and location of the address constant.

SUMMARY OF THE PREFERRED EMBODIMENTS

Preferred embodiments are directed to a method, system and program for generating an executable file for execution by a computer. The computer receives a plurality of programming language statements comprising a source program. The computer translates the source program into an object module which includes a text portion and a fix-up target defining a location within the text portion. A relocation directory includes information indicating a referenced item; reference type information indicating a type of the referenced item; and operation type information indicating an operation performed on the referenced item and contents of the fix-up target. The computer then processes the reference type and the operation type information in the relocation directory and determines a result of performing the operation specified in the operation type information on the referenced item and the contents of the fix-up target. The computer then relocates into the location of the fix-up target the result of the operation performed on the referenced item and the contents of the fix-up target.

In further embodiments, the referenced item may comprise an address, an offset length, a pseudo register vector length, a numerical value, a set of data, a set of instructions, and a symbol.

In still further embodiments, the operation type information may indicate that the operation comprises addition, subtraction, negating the fix-up target, shifting, multiplication, division, logical AND, logical OR, logical XOR, and moving.

Preferred embodiments expand the types of reference items that may be relocated into the fix-up target field, i.e the address constant location, and the operations which may be performed on the referenced items. Further embodiments further add to the relocation directory to include information which describes the referenced item and the operations to be performed thereon, including information on the expanded operations and reference items of the present invention. In this way, preferred embodiments provide for expanded relocation types and operations to be performed thereon.

DETAILED DESCRIPTION OF PREFERRED EMBODIMENTS

In the following description, reference is made to the accompanying drawings which form a part hereof, and in which is shown by way of illustration embodiments of the invention. It is understood that other embodiments may be utilized and structural changes may be made without departing from the scope of the present invention.

Hardware and Software Environment

Figure 1:
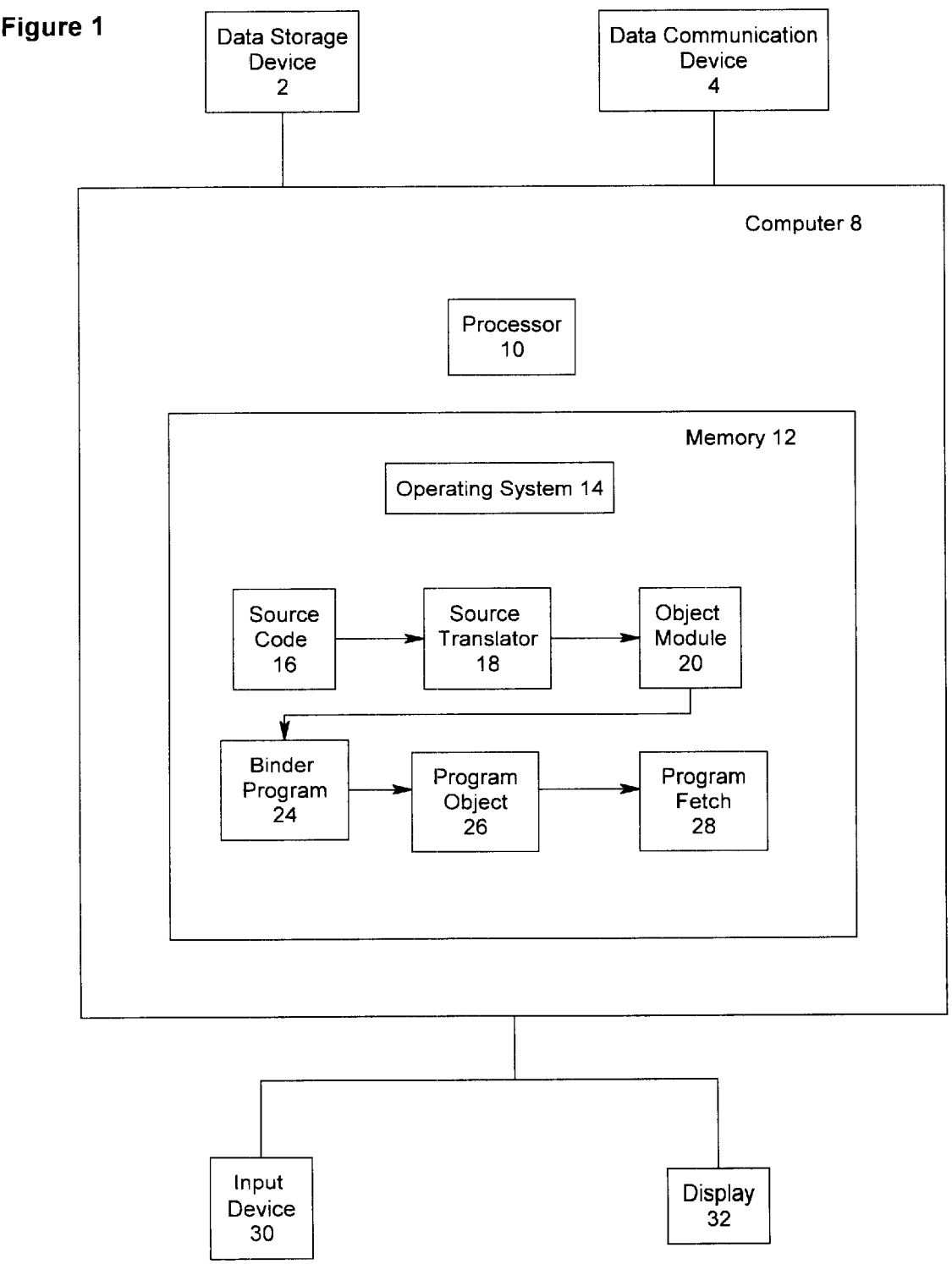
FIG. 1 is a block diagram illustrating an exemplary hardware environment and programs stored in memory in accordance with preferred embodiments of the present invention.

FIG. 1 is a block diagram illustrating an exemplary hardware environment in which preferred embodiments may be implemented. In the exemplary hardware environment, a computer 8 may include, inter alia, a processor 10, memory 12 (e.g., random access memory (RAM)), an input device 30 (e.g., keyboard, mouse pointing device, voice activated input device, etc.), display 32 (e.g., CRT, LCD displays, etc.), as well as a data storage device 2 (e.g., hard, floppy, and/or CD-ROM disk drives, etc.), and/or data communication device 4 (e.g. modems, network interfaces, etc.). It is envisioned that attached to the computer 8 may include other devices such as read only memory (ROM), a video card, bus interface, printers, etc. Those skilled in the art will recognize that any combination of the above components, or any number of different components, peripherals, and other devices known in the art, may be used with the computer 8.

The computer 8 operates under the control of an operating system (OS) 14, such as IBM's MVS, VM or OS/390 or any other operating system known in the art, such as WINDOWS, UNIX, LINUX, etc.** The operating system 14 is booted into the memory 12 of the computer 8 for execution when the computer 8 is powered-on or reset. In turn, the operating system 14 then controls the execution of one or more computer programs, including a source translator 18, binder program 24, and a program fetch 28 program. These programs 18, 24, and 28 process source code 16, an object module 20, and a program object 26 to generate a final executable file which is loaded into memory. The present invention is generally implemented in these computer programs 18, 24, and 28, which execute under the control of the operating system 14 and cause the computer 8 to perform the desired functions as described herein. Alternatively, the present invention may be implemented in the operating system 14 itself.

The source translator 18 program, which usually is a compiler or assembler, analyzes the source code 16 statements loaded into the memory 12. The source code 16 is generally stored in a text file on the data storage device 2, and or entered interactively by a programmer from the input device 30. The source translator 18 translates the source code 16 into an object module 20 containing a machine readable representation of the translated source code and additional bookkeeping information used to generate the final executable file. The binder program 24, which performs the functions of a linkage editor, receives as input at least one or more object modules 20 or a combination of object modules 20 and program objects 26, and produces as output a program object 26 which synthesizes the text and related program management information from the input. When binding object modules, the binder program 24 determines whether a relocation directory identifies any address constants within the text of the object module into which referenced items are to be relocated. Previously, the source translator 18 would have generated fields within the relocation directory which indicate the reference type of the items to be relocated into the address constant location and the operation to be performed on the referenced item.

A program object 26 is an improved type of load module. Details of a binder program 24 and program object 26 are described in detail in U.S. Pat. No. 5,553,286, which was incorporated by reference above. The term program object as used herein refers to the program object discussed in the above patent and any other load module type program known in the art. The program fetch 28 loads the executable text from the program object 26 into memory 12 for execution by the processor 10. This process of binding and loading text into memory is described in detail in "Linkers and Loaders," by Leon Presser and John R,. White, ACM Computing Surveys, Vol. 4, No. 32, September 1972, pp. 149–167, which is incorporated by reference herein in its entirety.

The operating system 14, source code 16, source translator 18, binder program 24, and program fetch 28 are all comprised of instructions which, when read and executed by the computer 8, cause the computer 8 to perform the preferred embodiment binding operations on the object module 20 and the program object 26. Generally, the operating system 14, source code 16, source translator 18, object module 20, binder program 24, program object 26, and program fetch 28 are all tangibly embodied in and/or readable from a device, carrier or media, such as memory 12, data storage device 2, and or data communications device 4. Under control of the operating system 14, the programs and data 18, 16, 20, 24, 26, and 28 may be loaded from memory 12, data storage device 2 and/or data communications device 4 into the memory 12 of the computer 8 for use during actual operations.

Those skilled in the art will recognize that the exemplary environment illustrated in FIG. 1 is not intended to limit the preferred embodiments. Indeed, those skilled in the art will recognize that other alternative hardware environments and programs may be used without departing from the scope of the present invention.

The Object Module

Figure 2:
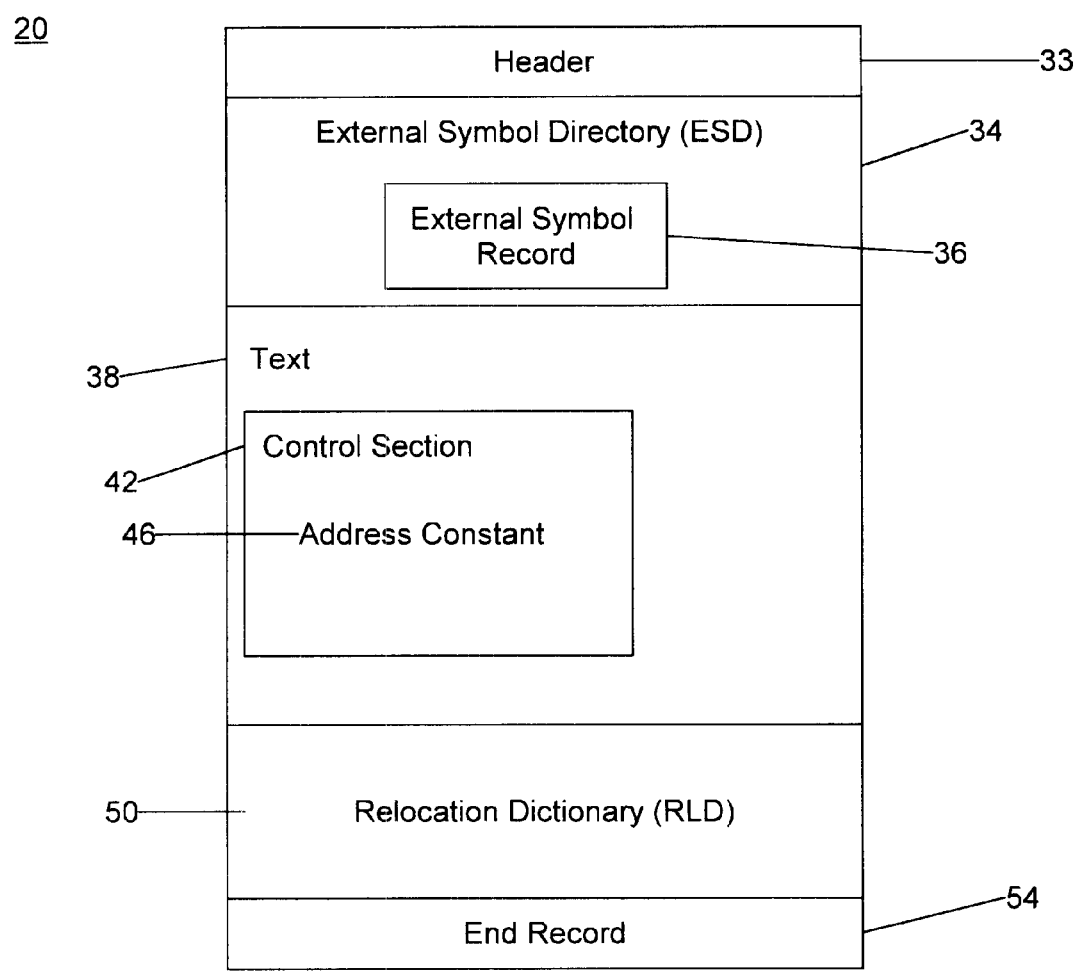
FIG. 2 is a block diagram of fields included in an object module in accordance with preferred embodiments of the present invention.

A preferred embodiment of the six basic record types often included in an object module 20 are shown in FIG. 2. These record types include: a header record (HDR) 33; an external symbol directory (ESD) 34, including an external symbol record 36, and related records; a text record 38; a relocation directory record (RLD) 50 and related records; and an end of record 54. The text section 38 may include control sections 42, which may further include address constants 46.

An external symbol is a symbol that is "public" and can be referenced by other object modules and program objects. An external symbol may be classified as representing either an external symbol definition or an external symbol reference. An external symbol definition symbol points to text or an address within the present object module or program object, i.e is defined therein. An external symbol reference means that the symbol references an external symbol definition in an independently translated object module or program object. The external symbol directory (ESD) 34 lists an external symbol record 36 for each symbol defined or referenced in the object module 20 or program object 26. In preferred embodiments, each external symbol record in the external symbol directory (ESD) 34 is provided an identification number referred to as an ESDID, which is the sequential number of the external symbol record 36 listed in the external symbol directory (ESD) 34.

Below is a description of three common types of external symbols.

Section Definition (SD): This entry specifies the name of a control section containing text.

Label Definition (LD): The LD is the name of a position at a fixed offset within a control section, typically an entry point name. An entry point name is used to reference a particular point within a control section. Thus, a point within the control section can be defined by the LD type symbol.

External Reference (ER): An external reference is the name of a symbol defined elsewhere, to which the module wants to refer.

The section definition (SD) and label definition (LD) external symbols are definitions because they refer to a location within the present object module. The control section (SD) external name references the location of a specific control section within the module. The label definition (LD) external definition references a particular entry point or location within a control section. The external reference (ER) symbol is an external reference as it refers to an external definition symbol in another object module 20 or program object 26.

As discussed, the binder program 24 receives as its input object modules 20 or a combination of object modules 20 and program objects 26, and synthesizes them into a program object 26. The binder program 24 also creates a combined external symbol directory (CESD) within the program object 26 that includes the external symbols from the bound object modules 20 and program objects 26. If during binding, an external symbol definition (e.g LD or SD) in one of the input object modules 20 or program objects 26 matches an external symbol reference in another object module 20 or program object 26, then that external symbol reference is resolved because the external definition for that symbol is now defined in the program object 26. Only one entry is retained in the combined external symbol directory (CESD), the definition of the external symbol (LD or SD) naming the referent text. When an external reference is resolved, the external symbol referenced by the address constant can be relocated to the location of the address constant.

If an external reference is not matched with a definition (SD or LD), then the external reference is left in the external symbol directory 34 as an unresolved external reference. Generally, all external references must be resolved before the program object 26 can be successfully executed. This may be accomplished by referring to a call library containing object modules or program objects which contain definitions for additional external symbols.

With reference to FIG. 2, each object module 20 includes at least one or more control sections (CSECTS) 42. A control section 42 is a subunit of a module constituting a basic indivisible unit of linking and data manipulation. The order of the control sections in the module may be altered without altering the operating logic of the program.

Figure 3:
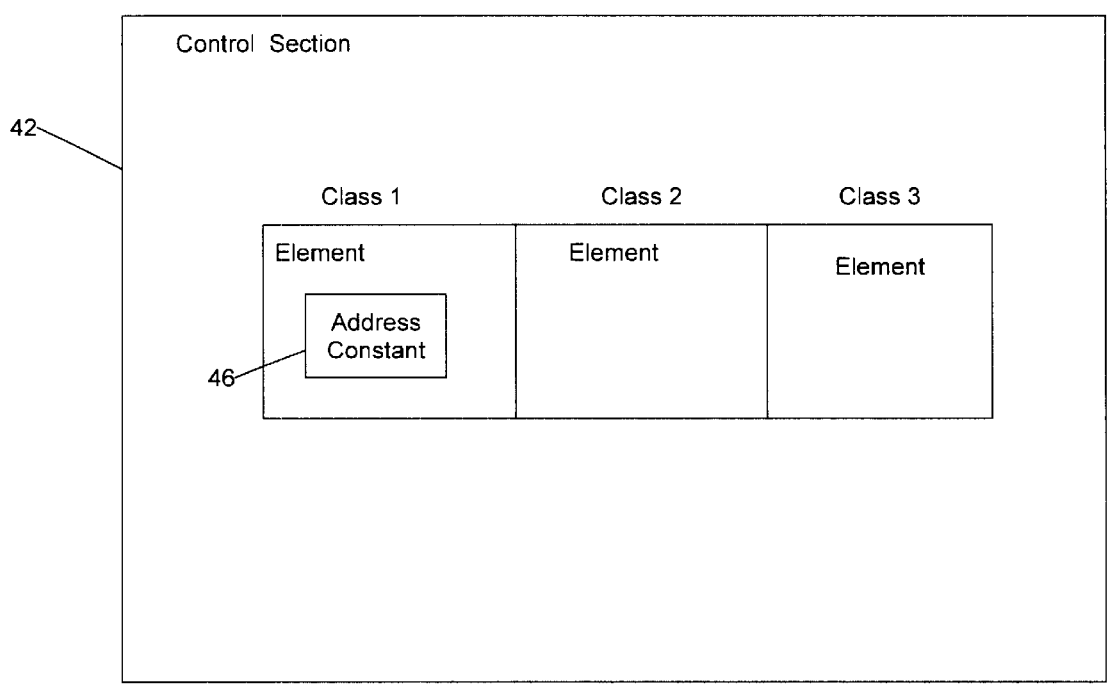
FIG. 3 is a block diagram illustrating an alternative arrangement of certain fields included in an object module in accordance with preferred embodiments of the present invention.

FIG. 3 illustrates an alternative arrangement of a control section as containing one or more elements of text. An element is the basic unit for relocation. Each element in a module is associated with a class, e.g., Class 1, 2, 3. All elements in a given class have the same attributes, format, and function. Classes have names in the external symbol directory (ESD) just as CSECTS do. Each element has an ID number, an ESDID, which identifies the control section and class with which the element is associated. Thus, the element and its associated ESDID are used to identify a particular unit of text within an object module 20 or program object 26.

The address constant 46, which is included in a control section 42, defines a location within the text whose contents are usually not known after source code 16 translation. The location of the address constant 46 is also referred to as a fix-up target or relocation target, i.e., the location in the text where the item referenced by the address constant 46 will be placed. Address constants 46 may reference items in the same object module 20 containing the address constant 46, i.e an internal reference, or items located in another object module 20 or program object 26, i.e an external reference. Address constants may reference an address via an external symbol. The referenced item is used to alter the contents of the address constant 46 during operations performed by the binding program 24 or program fetch 28. This alteration may be relocation or another specified operation.

Figure 4:
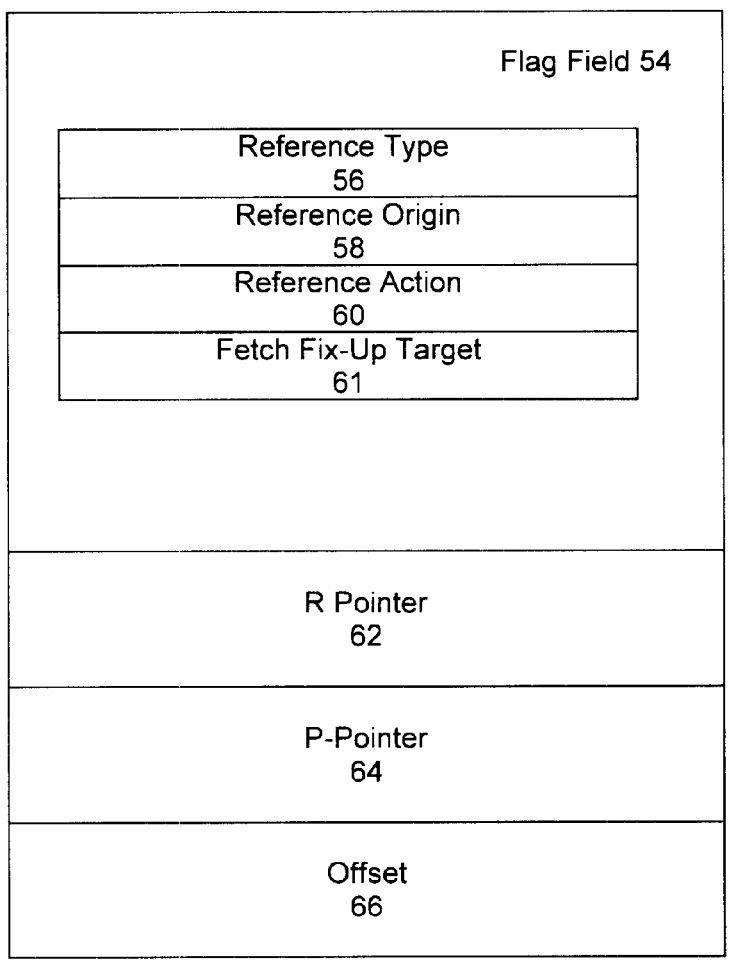
FIG. 4 is a block diagram of fields included in a relocation directory record in accordance with preferred embodiments of the present invention.

The relocation directory 50 within the object module 20 includes at least one entry for each address constant 46. FIG. 4 provides a block diagram of a preferred embodiment of the information fields within a relocation directory 50, including a flag field 54, R-pointer 62, P-pointer 64, and offset 66. Other information about address constants may also be included in the relocation directory 50. The flag field 54 includes extended relocation information discussed below concerning the operations performed on the item referenced by the address constant 46. The R-pointer 62 contains the ESDID of the external symbol which the address constant references. The text the external symbol references may be located within the object module 20 containing the address constant 46 or in another object module 20 or program object 26.

The P-pointer 64 contains the ESDID of the element, e.g., one of the elements as shown in FIG. 3, within which the address constant 46 resides. This element ESDID identifies the class and control section containing the address constant. The offset 66 contains the offset within the element described by the P-pointer 64 at which the address constant 46 is located. The P-pointer 64 and offset 66 fields together point to the location of the address constant 46 where the referenced item is to be relocated.

Extended Relocation Types

As discussed, the flag field 54 includes information on the address constant 46 and the referenced item. The binder program 24 uses this information to relocate the referenced item into the location in the text at which the address constant 46 is found, or fix-up target, i.e the position identified by the P-pointer 64 and offset 66 fields in the relocation directory 50.

The reference type 56 field includes information on the attributes of the referenced item. If the reference type 56 is an address type, then this means that the referenced item is an address. If the reference type is an offset, then this indicates to the binder program 24 that the offset to the referenced item is to be used. If the reference type is a length type, then this indicates to the binder 24 that the reference is to the length of the referenced item.

In preferred embodiments, the binder program 24 may use the address constant 46 for more than just the basic relocation of a referenced address. For instance, if the reference type field 56 is a value, then this indicates to the binder 24 that the referenced item is a numerical constant which should be used in an operation performed on the referenced item before it is stored into the address constant 46 location.

If the reference type field 56 is text, then this indicates that the referenced item includes a set of instructions or other machine language data which is copied into the address constant 46 location. This is useful when the object module 20 or program object 26 wants to reference a common set of instructions or data which are not known until binding. The translator 18 creates a common field for instructions or data which is referenced by address constants 46 in different programs by setting their reference type 56 to indicate that the referenced item is text. To reference this text, the programs include an address constant 46 pointing to the field holding the text. In this way, commonly used code can be replicated in the text. This text reference type 56 allows the automated updating of programs because if the referenced text is updated, then that updated text will be relocated into all address constant 46 locations referring to such code. Moreover, the amount of text is not constrained to a limited number of bytes.

If the reference type field 56 is a symbol, then this indicates that a symbol name is the referenced item which will be moved to the location of the address constant 46. If the reference type field 56 is a binder-loader token, then this indicates that the address constant location 46 will be updated with information used at execution time to instruct the program loader how to locate portions of the program that have been prepared for dynamic loading requests. A token is an "anchor" or "hook" on the loaded text to locate the dynamically-loadable part(s).

In these ways, the address constant 46 and its relocation directory 50 are doing more than just relocating text by using a value with actions and operations discussed below.

The reference origin field 58 in the relocation directory 50 indicates what type of item will be used as the base or origin for calculating offsets and lengths in the relocation operations. The reference action 60 field indicates the operation the binder will perform on the content of the address constant 46 and the referenced item before relocating the referenced item into the address constant 46 location. Preferred embodiments provide for many types of actions or operations that can be performed on the referenced item. In these actions, the first operand refers to the content of the address constant 46 location, i.e., the fetched value. In preferred embodiments, the relocation directory 50 includes a field which indicates the value for the first operand, referred to as the Fetch Fix-up Target field 61 in FIG. 3. For instance, this field 61 can indicate that the first operand is set to binary zero or to the present content of the address constant 46 location (fix-up target). The first operand is set to zero to ignore the content of the address constant 46. In this way, the result of the operation on the referenced item is selectively dependent on the referenced item previously relocated into the address constant 46 location. The second operand in the operation is the referenced item.

Below is a list of different types of operations performed on the first and second operands in preferred embodiments:

Addition: the second operand is added to the first.

Subtraction: the second operand is subtracted from the first.

Unary: the first operand is negated.

Shift: the first operand is shifted arithmetically, with sign preserved; the direction depends on the sign of the second operand, left (+) or right (−), and the amount of the shift is determined by a magnitude value.

Multiplication: the first operand is multiplied by the second.

Quotient: the quotient when the first operand is divided by the second.

Remainder: the remainder when the first operand is divided by the second.

Logical AND: the first operand is logically ANDed with the second operand.

Logical OR: the first operand is logically ORed with the second operand.

Logical XOR: the first operand is logically XORed with the second operand.

Move Text: moving the text at the second operand into the location of the first operand. A target field byte length may indicate the number of bytes to move from the second operand into the location of the first operand. If the second operand is shorter than the first operand, only the available second operand bytes are moved, and the remainder of the first operand field is unchanged. If the second operand is longer than the first operand, only the designated number of bytes are moved.

For instance, the move text operation would typically be used when the reference type is a symbol or text, thereby causing the referenced symbol or text to be moved to the address constant 46 location. The value reference type would typically be used for a shift operation to indicate the magnitude and direction of the shift of the first operand, or for other arithmetic operations. The address reference type could be used for addition, subtraction, multiplication, division, Logical AND, OR, and XOR.

Preferred embodiments expand the use of the address constant 46 and relocation directory 50 to perform different types of operations on different types of referenced items. No longer is the address constant 46 limited to just relocating an address from one location to the next. Preferred embodiments allow the binder 24 to perform numerous and powerful types of operations using the address constant based on the type of information included in the reference type 56, origin 58, action 60, and fetch fix-up target 61 fields.

It should be appreciated that in alternative embodiments, data structures and formats for the fields in the relocation directory 50, different from the reference types and operations disclosed herein, may be used for maintaining information on the reference type and the action performed. Moreover, alternative embodiments of the relocation directory 50 may be able to accommodate different reference types and actions in addition to the reference types and operations described herein.

Figure 5:
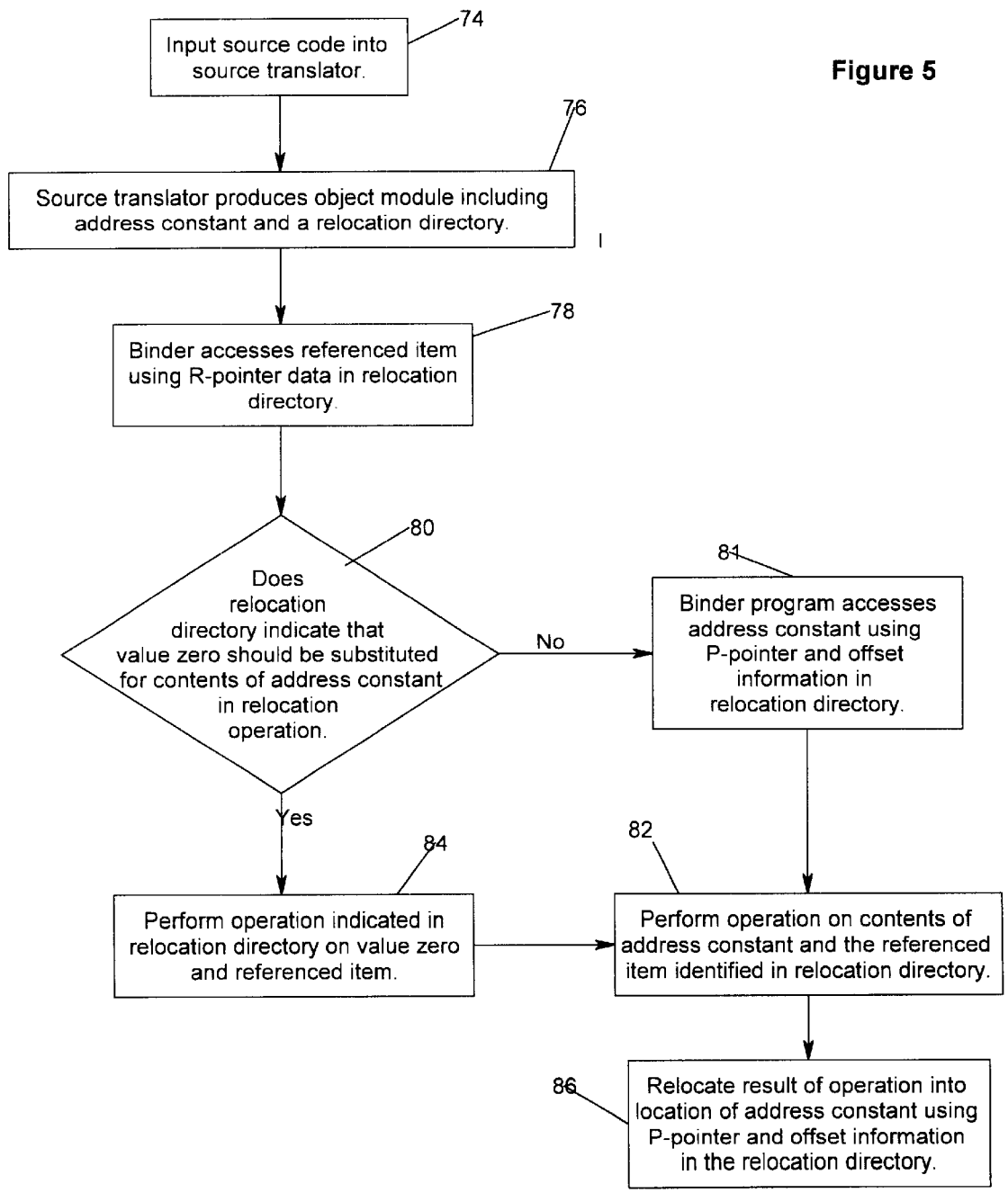
FIG. 5 is a flowchart illustrating how items are relocated in accordance with preferred embodiments of the present invention.

FIG. 5 is a flowchart illustrating logic of how relocation information is generated and used. Control begins at step 74 with the source translator 18 receiving as input the source code 16. At step 76, the source translator 18 generates an object module 20 based on the source code 16, including the relocation directory 50. This relocation directory 50 includes information on the extended reference types 56, the reference origin 58, the reference action 60, the fetch fix-up target 61, and the other information presented in FIG. 4.

At step 78, the binder program 24 accesses the referenced item based on the R-pointer 62 information in the relocation directory 50, which provides the ESDID of the referenced item. At step 80, the binder program 24 processes the fetch fix-up target 61 information to determine whether the content of the address constant 46 or a value of zero should be used in the relocation operation. If the value zero should be used, then at step 84, the binder program 24 performs the operation specified in the reference action 60 information on the referenced item and value zero. If the fetch fix-up target 61 information indicates that the content of the address constant 46 should be used, then, at step 81, the binder 24 accesses the contents of the address constant 46. At step 82 the binder 24 performs the operation specified in the reference action 60 information on the referenced item and the content of the address constant 46. From step 82 or 84, the binder 24 proceeds to step 86 to use the P-pointer 64 and offset 66 information to relocate the result of the operation at step 82 or 84 into the location of the address constant 46 in the program object 26. It should be appreciated that in alternative embodiments different steps may be used, or steps added to the method disclosed in FIG. 5.

Conclusion

This concludes the description of the preferred embodiment of the invention. The following describes some alternative embodiments for accomplishing the present invention.

For example, any type of computer, such as a mainframe, minicomputer, work station or personal computer, could be used with the preferred embodiments.

In addition, any operating system including a compiler, assembler, linking, linkage editor, and loader programs, if these other programs use different linking and loading interface conventions, could benefit from the present invention. Still further, in alternative embodiments, the relocation directory (RLD) may include reference types, operation types, information, and data structures which are different from those of the preferred embodiments.

Preferred embodiments described above disclose separate programs for translating, binding, and loading. However, it should be appreciated that in alternative embodiments the functions performed by these separate program categories may be grouped into one or more programs in a manner different from the grouping of functions discussed above.

Preferred embodiments discussed above also describe certain operations occurring at certain times. For instance, external symbols are resolved and address constants are relocated during binding. However, it should be appreciated that in alternative embodiments these operations, resolving external symbols and relocating address constants, may occur during load time when the program fetch program loads the text from the program objects into the memory or at some other time during the process of translating the source code to machine executable code loaded into the memory.

In summary, preferred embodiments disclose a method, system, and program for generating an executable file for execution by a computer. The computer receives a plurality of programming language statements comprising a source program. The computer translates the source program into an object module which includes a text portion and a fix-up target defining a location within the text portion. A relocation directory includes information indicating a referenced item that is relocated into the fix-up target; reference type information indicating a type of the referenced item; and operation type information indicating an operation performed on the referenced item and contents of the fix-up target. The computer then processes the reference type and the operation type information in the relocation directory and determines a result of performing the operation specified in the operation type information on the referenced item and the contents of the fix-up target. The computer then relocates into the location of the fix-up target the result of the operation performed on the referenced item and the contents of the fix-up target.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

** Microsoft is a registered trademarks of Microsoft Corporation; OS/390 is a registered trademarks of IBM, MVS and VM are trademarks of IBM; UNIX is a registered trademark licensed through the is licensed exclusively through X/Open Company Limited; Linux is a trademark of Linus Torvalds.

What is claimed is:

1. A method of generating an executable file for execution by a computer, comprising:
   receiving a plurality of programming language statements comprising a source program into the computer;
   translating the source program into an object module in the computer, wherein the object module includes:
   (i) a text portion;
   (ii) a fix-up target defining a location within the text portion;
   (iii) a relocation directory including information indicating: a referenced item that is relocated into the fix-up target; reference type information indicating a type of the referenced item; and operation type information indicating an operation performed on the referenced item and contents of the fix-up target;
   processing the reference type and the operation type information in the relocation directory;
   determining a result of performing the operation specified in the operation type information on the referenced item and the contents of the fix-up target; and
   relocating into the location of the fix-up target the result of the operation performed on the referenced item and the contents of the fix-up target.

2. The method of claim 1, wherein the referenced item is a member of a set of operations comprising an address, an offset length, a pseudo register vector length, a numerical value, a set of data, a set of instructions, and a symbol.

3. The method of claim 1, wherein the operation type information indicates that the operation performed is a member of a set of operations comprising addition, subtraction, negating the fix-up target, shifting, multiplication, division, logical AND, logical OR, logical XOR, and moving.

4. The method of claim 3, wherein the referenced item is a member of the set comprising a set of instructions and a symbol, and the operation type information indicates that the operation performed is moving, wherein the operation is performed by moving the referenced item to the fix-up target.

5. The method of claim 3, wherein the referenced item is a numerical value and the operation type information indicates that the operation performed is shifting, wherein the operation is performed by shifting the contents of the fix-up target according to the sign and magnitude of the reference.

6. The method of claim 1, wherein the relocation directory further includes information indicating whether a value of zero is substituted for the contents of the fix-up target, and further comprising:

performing the operation indicated by the operation type information on the referenced item and the value zero when the relocation directory indicates that the value of zero is substituted for the contents of the fix-up target; and performing the operation indicated by the operation type information on the referenced item and the contents of the fix-up target when the relocation directory indicates that the contents of the fix-up target is used in the operation with the referenced item.

7. The method of claim 1, wherein a translator program receives the programming language statements, translates the source program into the object module operation, and relocates the result of the operation into the fix-up target location.

8. A computer system for generating an executable file for execution by a computer, comprising:

a computer;

a memory accessible to the computer; program logic, executed by the computer, comprising:

(i) means for receiving a plurality of programming language statements comprising a source program into the computer;

(ii) means for translating the source program into an object module in the memory, wherein the object module includes:

(a) a text portion;

(b) a fix-up target defining a location within the text portion;

(c) a relocation directory including information indicating: a referenced item that is relocated into the fix-up target; reference type information indicating a type of the referenced item; and operation type information indicating an operation performed on the referenced item and contents of the fix-up target;

(iii) means for processing the reference type and the operation type information in the relocation directory;

(iv) means for determining a result of performing the operation specified in the operation type information on the referenced item and the contents of the fix-up target; and (v) means for relocating into the location of the fix-up target the result of the operation performed on the referenced item and the contents of the fix-up target.

9. The system of claim 8, wherein the referenced item is a member of a set of operations comprising an address, an offset length, a pseudo register vector length, a numerical value, a set of data, a set of instructions, and a symbol.

10. The system of claim 8, wherein the operation type information indicates that the operation performed is a member of a set of operations comprising addition, subtraction, negating the fix-up target, shifting, multiplication, division, logical AND, logical OR, logical XOR, and moving.

11. The system of claim 10, wherein the program logic further comprises means for moving the referenced item to the fix-up target when the referenced item is a member of the set comprising a set of instructions and a symbol and the operation type information indicates that the referenced item is moved to the fix-up target.

12. The system of claim 10, wherein the program logic further comprises means for shifting the contents of the fix-up target according to the sign and magnitude of the referenced numerical value when the referenced item is a numerical value and the operation type information indicates that the contents of the fix-up target is shifted.

13. The system of claim 8, wherein the relocation directory further includes information indicating whether a value of zero is substituted for the contents of the fix-up target, and wherein the program logic further includes:

means for performing the operation indicated by the operation type information on the referenced item and the value zero when the relocation directory indicates that the value zero is substituted for the contents of the fix-up target; and means for performing the operation indicated by the operation type information on the referenced item and the contents of the fix-up target when the relocation directory indicates that the contents of the fix-up target is used in the operation with the referenced item.

14. The system of claim 8, wherein the means for receiving the programming language statements, translating the source program into the object module, and relocating the result of the operation into the fix-up target location is implemented in a binder program.

15. An article of manufacture for generating an executable file for execution by a computer, the article of manufacture comprising computer usable storage media including at least one computer program embedded therein that is capable of causing the computer to perform:

receiving a plurality of programming language statements comprising a source program into the computer;

translating the source program into an object module in the computer, wherein the object module includes:

(a) a text portion;

(b) a fix-up target defining a location within the text portion;

(c) a relocation directory including information indicating: a referenced item that is relocated into the fix-up target; reference type information indicating a type of the referenced item; and operation type information indicating an operation performed on the referenced item and contents of the fix-up target;

processing the reference type and the operation type information in the relocation directory;

determining a result of performing the operation specified in the operation type information on the referenced item and the contents of the fix-up target; and relocating into the location of the fix-up target the result of the operation performed on the referenced item and the contents of the fix-up target.

16. The article of manufacture of claim 15, wherein the referenced item is a member of a set of operations comprising an address, an offset length, a pseudo register vector length, a numerical value, a set of data, a set of instructions, and a symbol.

17. The article of manufacture of claim 15, wherein the operation type information indicates that the operation performed is a member of a set of operations comprising addition, subtraction, negating the fix-up target, shifting, multiplication, division, logical AND, logical OR, logical XOR, and moving.

18. The article of manufacture of claim 17, wherein the referenced item is a member of the set comprising a set of instructions and a symbol, and the operation type information indicates that the operation performed is moving, wherein the operation is performed by moving the referenced item to the fix-up target.

19. The article of manufacture of claim 17, wherein the referenced item is a numerical value and the operation type information indicates that the operation performed is shifting, wherein the operations is performed by shifting the contents of the fix-up target according to the sign and magnitude of the reference.

20. The article of manufacture of claim 15, wherein the relocation directory further includes information indicating whether a value of zero is substituted for the contents of the fix-up target, and further including:

performing the operation indicated by the operation type information on the referenced item and the value zero when the relocation directory indicates that the value of zero is substituted for the contents of the fix-up target; and performing the operation indicated by the operation type information on the referenced item and the contents of the fix-up target when the relocation directory indicates that the contents of the fix-up target is used in the operation with the referenced item.

21. The article of manufacture of claim 15, wherein a translator program receives the programming language statements, translates the source program into the object module operation, and relocates the result of the operation into the fix-up target location.

* * * * *